United States Patent [19]
Young

[11] Patent Number: 5,566,370
[45] Date of Patent: Oct. 15, 1996

[54] SIMULATION DISPLAY SYSTEM

[75] Inventor: C. Gilbert Young, Winter Park, Fla.

[73] Assignee: Lockheed Martin Corporation, Bethesda, Md.

[21] Appl. No.: 334,265

[22] Filed: Nov. 3, 1994

[51] Int. Cl.⁶ ..................................................... H04N 13/00
[52] U.S. Cl. ........................... 348/36; 434/44; 359/631; 359/453; 348/776; 348/39; 348/121
[58] Field of Search ..................................... 348/36,39, 42, 348/51–56, 115, 121, 123, 124, 776, 778, 779; 359/631–633, 453–459; H04N 13/00

[56] References Cited

U.S. PATENT DOCUMENTS

| | | | |
|---|---|---|---|
| 2,975,671 | 3/1961 | Hemstreet | 88/24 |
| 3,621,214 | 11/1971 | Romney et al. | 235/151 |
| 3,643,345 | 2/1972 | Wilton et al. | 35/12 N |
| 3,670,426 | 6/1972 | Horowitz | 35/12 N |
| 3,744,049 | 7/1973 | Luce | 340/336 |
| 3,826,864 | 7/1974 | Paufve | 178/6.8 |
| 3,842,589 | 10/1974 | Luce et al. | 58/50 R |
| 3,955,355 | 5/1976 | Luce | 58/50 R |
| 3,961,133 | 6/1976 | Bennett | 178/6.8 |
| 4,056,827 | 11/1977 | Spooner et al. | 348/36 |
| 4,195,911 | 4/1980 | Bourgon et al. | 348/38 |
| 4,322,726 | 3/1982 | Collier et al. | 340/705 |
| 4,347,507 | 8/1982 | Spooner | 348/38 |
| 4,383,740 | 5/1983 | Bordovsky | 348/121 |
| 4,473,355 | 9/1984 | Pongratz | 434/44 |
| 4,512,745 | 4/1985 | Mohon et al. | 348/123 |
| 4,566,758 | 1/1986 | Bos | 350/346 |
| 4,582,396 | 4/1986 | Bos et al. | 350/347 E. |
| 4,652,087 | 8/1987 | Bos et al. | 350/332 |
| 4,656,506 | 4/1987 | Ritchey | 438/776 |
| 4,670,744 | 6/1987 | Buzak | 340/716 |
| 4,726,663 | 2/1988 | Buzak | 350/347 E |
| 4,729,639 | 3/1988 | Hubbard | 350/346 |
| 4,744,636 | 5/1988 | Haven et al. | 350/331 R |
| 4,758,818 | 7/1988 | Vatne | 340/701 |
| 4,765,717 | 8/1988 | Buzak et al. | 350/331 R |
| 4,784,883 | 11/1988 | Chitwood et al. | 428/1 |
| 4,791,339 | 12/1988 | Draz et al. | 315/386 |
| 4,808,979 | 2/1989 | DeHoff et al. | 340/709 |
| 4,830,464 | 5/1989 | Cheysson et al. | 350/174 |
| 4,857,906 | 8/1989 | Connor | 340/784 |
| 4,859,031 | 8/1989 | Berman et al. | 350/174 |
| 4,870,398 | 9/1989 | Bos | 340/784 |
| 4,884,874 | 12/1989 | Buzak et al. | 350/336 |
| 4,900,132 | 2/1990 | Bos | 350/346 |
| 4,916,308 | 4/1990 | Meadows | 250/221 |
| 4,917,463 | 4/1990 | Buzak et al. | 350/331 R |
| 4,978,952 | 12/1990 | Irwin | 340/795 |
| 4,979,235 | 12/1990 | Rumbaugh et al. | 455/616 |
| 5,015,057 | 5/1991 | Rumbaugh et al. | 350/96.15 |
| 5,050,966 | 9/1991 | Berman | 359/38 |
| 5,060,932 | 10/1991 | Yamaguchi | 434/43 |
| 5,115,305 | 5/1992 | Baur et al. | |
| 5,130,794 | 7/1992 | Ritchey | 348/39 |
| 5,159,478 | 10/1992 | Akiyama et al. | 359/69 |
| 5,162,828 | 11/1992 | Furness et al. | 353/122 |
| 5,184,250 | 2/1993 | Lacroix | 359/631 |
| 5,187,603 | 2/1993 | Bos | 359/73 |
| 5,226,816 | 7/1993 | Hawkins | 434/38 |
| 5,242,306 | 9/1993 | Fisher | 348/121 |
| 5,329,310 | 7/1994 | Liljegren et al. | 348/39 |

OTHER PUBLICATIONS

Bob Peterson, "Big Picture LCD's", *Computers & Electronics*, Aug. 1984, pp. 49–51.
Gordon Graff, "Liquid Crystals", *High Technology*, May 1984, pp. 55–59, 62–66 and 68.
T. J. Scheffer, "Direct–Multiplexed Liquid Crystal Displays", Tektronix Laboratories, Tektronix Inc., Publication Date Unknown.

*Primary Examiner*—Tommy P. Chin
*Assistant Examiner*—Vu Le
*Attorney, Agent, or Firm*—Dellett and Walters

[57] ABSTRACT

A compact display system simulates a panoramic view to an observer located at a central viewing station. A toric mirror, comprising a compressed portion of a sphere, has a concave reflective surface disposed in surrounding relation to the given viewing station while a spherical rear projection screen which receives projected image light on its inner surface presents a panoramic image to the toric mirror from its outer surface. A plurality of projectors are disposed tangentially above the upper periphery of the rear projection screen and project associated portions of the light image onto the inside of the screen via fold mirrors. Each projector includes a high intensity CRT and a color shutter.

17 Claims, 7 Drawing Sheets

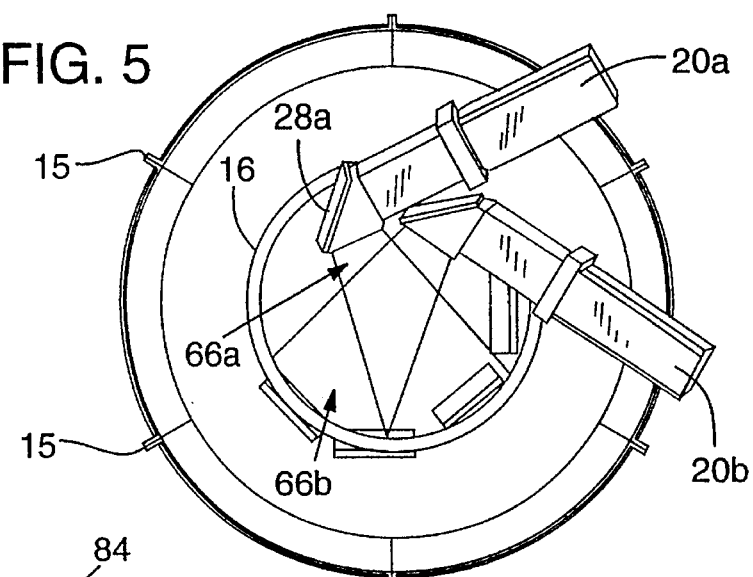
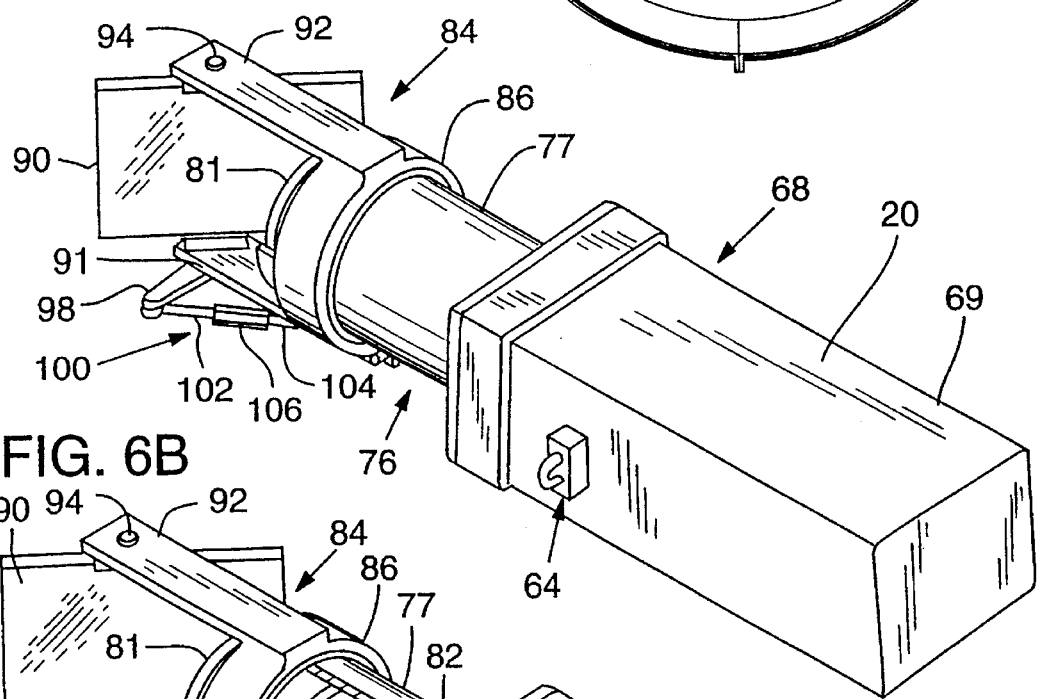
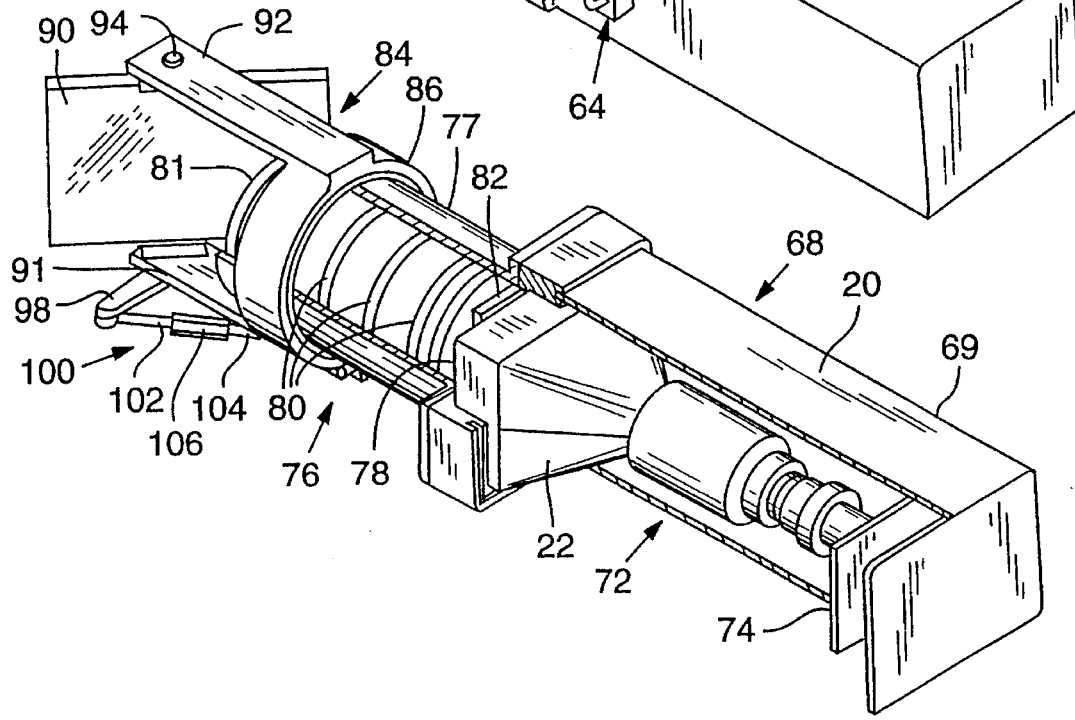

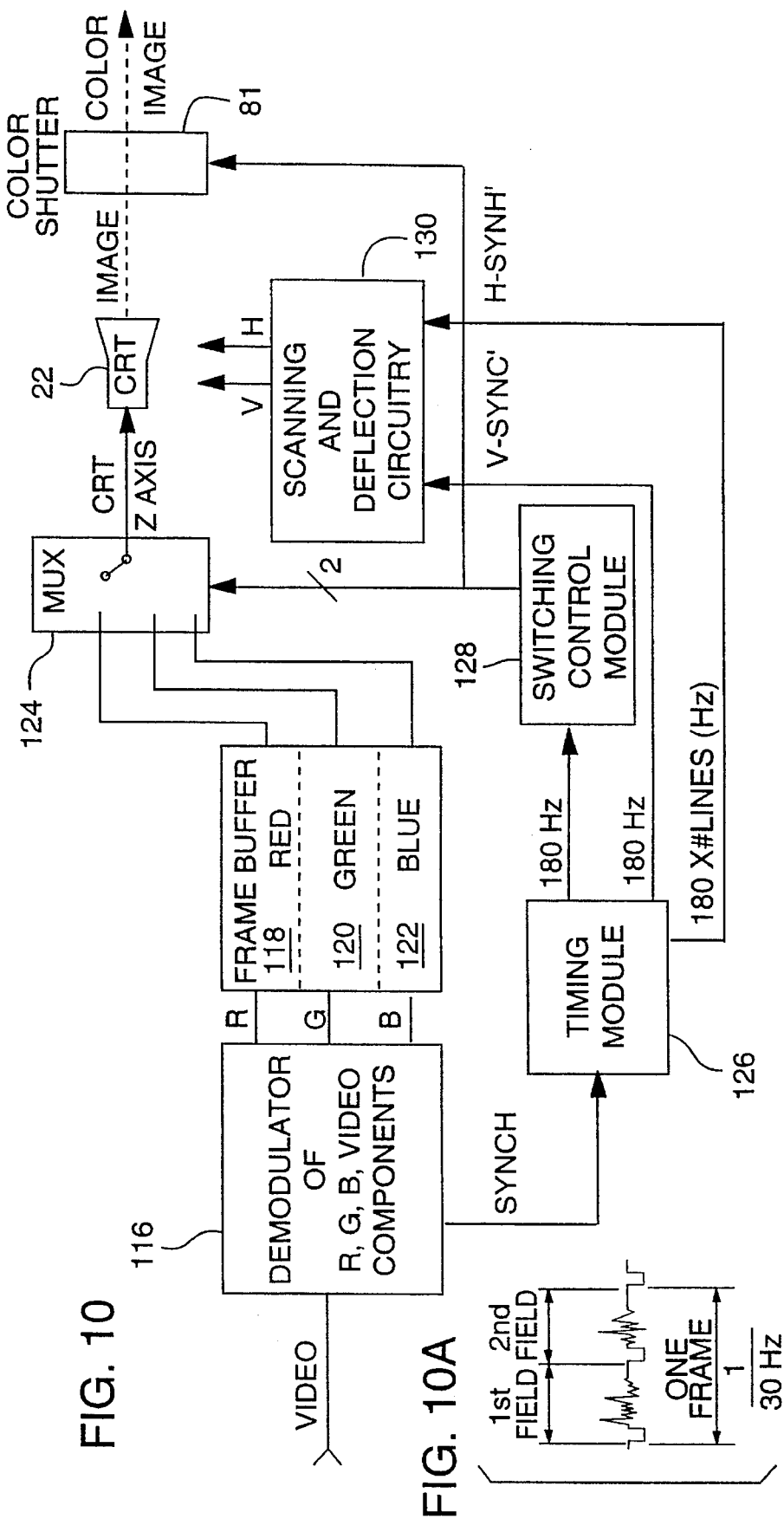

SIMULATION DISPLAY SYSTEM

BACKGROUND OF THE INVENTION

The present invention relates to a simulation display, and more particularly to a compact 360° panoramic simulation display system.

Visual display systems are known for simulating scenes that a viewer would observe from a hatch or window of a tank or armored carrier vehicle, or from the cockpit of an aircraft. The scene portrayed to the viewer is representative of surrounding terrain. Up until the present time, existing display simulators have been quite large, bulky and relatively fixed in position. Thus, a projection system "in the round" includes a plurality of viewing screens in circular array, while a number of projectors are synchronized for portraying segments of the panoramic scene. Alternatively, a mirror system can reduce the length of the overall projection path. For instance, a plurality of projectors can be positioned to depict portions of a display on a toroidal screen, wherein the latter comprises a segment of a sphere. The observer can view this screen through a toroidal mirror, also comprising a portion of a sphere. This arrangement is somewhat more compact and still provides the illusion of viewing a panoramic scene from a distance. Nevertheless, the apparatus tends to be large in size and not well adapted to transport from one location to another.

SUMMARY OF THE INVENTION

It is accordingly an object of the present invention to provide an improved 360° panoramic simulation display system.

It is a further object of the present invention to provide an improved panoramic simulation display system of a compact design.

In accordance with the present invention, plural projectors provide respective portions of a panoramic scene. A fold mirror associated with each projector forms part of an indirect optical path for the propagated light, while an intermediate imager receives projected light via the associated mirrors and displays a continuous image. A toric collimation reflector, comprising a compressed portion of a spherical surface, then forms an enlarged virtual image of the scene for observation. According to a preferred embodiment of the present invention, the aforementioned mirrors are disposed such that the projectors, intermediate imager and collimation reflector are contained within about a 2.5 ft. radius. Each of the mirrors effects a reflection angle of about 90°, with each projector disposed in space efficient, tangential relation to the intermediate imager and collimation reflector.

According to another aspect of the present invention, the intermediate imager comprises a spherical rear projection screen receiving projected light on an inner surface and presenting a panoramic object on an outer surface. The plurality of projectors supply projected light to the spherical rear projection screen, with each projector providing light for a predetermined portion of the image.

According to another feature of the present invention, each projector includes in one embodiment a high intensity CRT and a color shutter for producing a color display.

According to another aspect of the present invention, the apparatus for presenting the panoramic view is mounted on a platform having a central aperture where the viewer is located.

The subject matter of the present invention is particularly pointed out and distinctly claimed in the concluding portion of this specification. However, both the organization and method of operation, together with further advantages and objects thereof, may best be understood by reference to the following detailed description taken in connection with the accompanying drawings.

BRIEF DESCRIPTION OF THE DRAWINGS

FIG. 5 is a partial top view of the present invention showing placement of two projectors of a plurality of projectors and their associated image projection paths;

FIG. 6A is a perspective view of a projector employed with the present invention;

FIG. 6B is a partial cut-away view of the projector of FIG. 6A;

FIG. 10 is a block diagram of circuitry utilized to drive a CRT and color switch projector;

FIG. 10A depicts a video waveform;

DETAILED DESCRIPTION

Figure 1A:
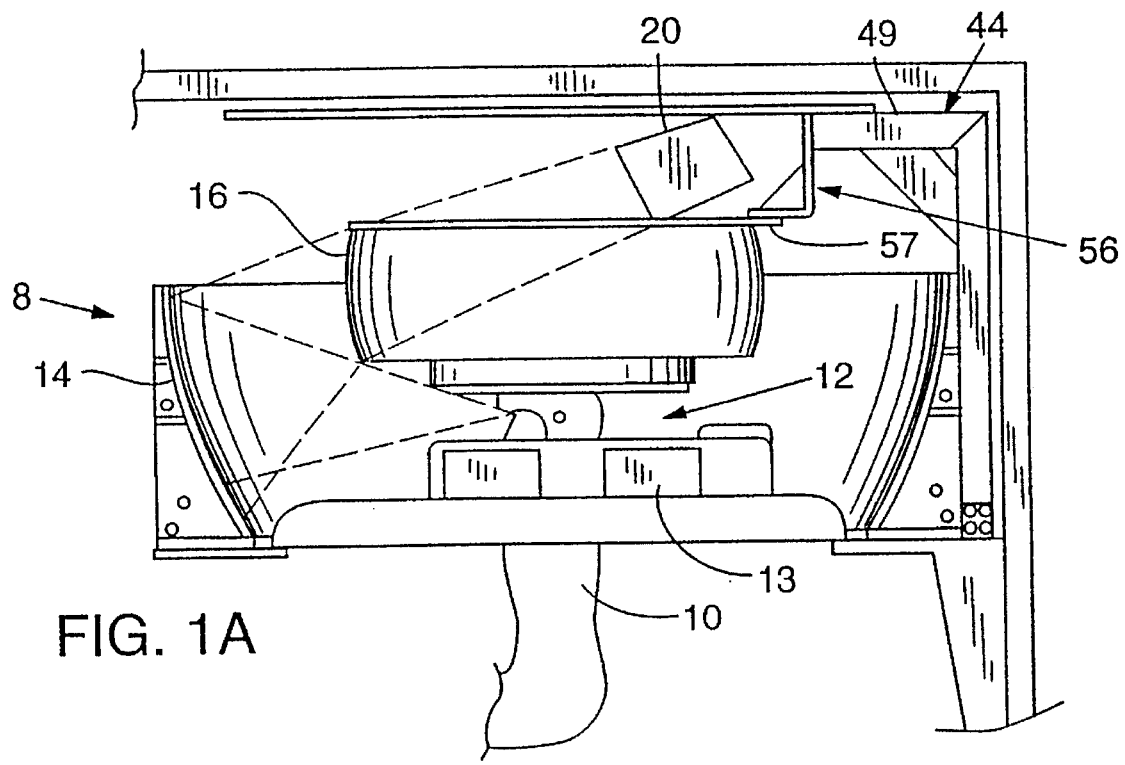
FIG. 1A is a partial cross-sectional view of the present invention illustrating an optical path for a given projector.

With reference to FIG. 1A, a compact panoramic projection system 8 according to the present invention presents a panoramic scene to viewer 10 who observes from station 12 at the center of the system. A projector 20 is disposed slightly above a peripheral lip of a spherical, translucent, rear projection screen 16 and directs light down and across the diameter of the screen onto the inner contoured surface of the screen. Projection screen 16, in a preferred embodiment, is a relatively thin monolithic body of translucent plastic that provides an image at its outer surface in accordance with light received on its inner surface.

Toric reflector or mirror 14, having a radius greater than that of the spherical rear projection screen, is disposed slightly below the horizontal plane that is central to the spherical rear projection screen. A toric reflector or mirror is advantageously employed because it controls divergence, convergence, dipvergence and distortion. Toric mirror 14 is one piece or suitably assembled from a number of concave mirror segments (six in this embodiment) wherein each spans a partial sector of the overall mirror configuration. Coupling flanges at the ends of each concave mirror segment confront similar flanges on neighboring segments by means of which the segments are secured together.

Figure 1B:
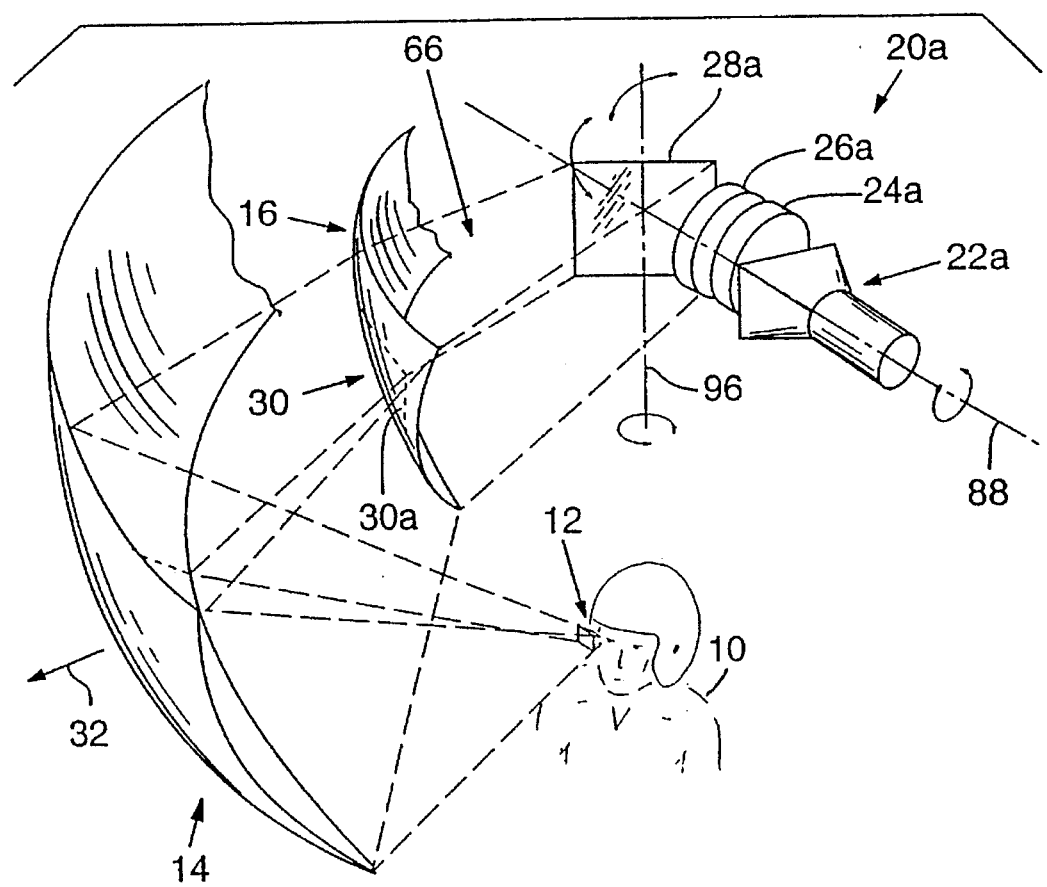
FIG. 1B is a partial perspective view illustrating the field of view of one projector forming a part of the present invention.

FIG. 1B illustrates fundamental features of the projection system. The spherical contour of projection screen 16 presents a continuous panoramic image 30 at its outer surface in accordance with light received on its inner surface. Toric mirror 14 reflects and collimates light rays from the image providing an enlarged virtual image at a location in the direction of arrow 32. Viewer 10 looking into the toric mirror 14 from center viewing station 12 sees the image of the spherical rear projection screen as an enlarged virtual image 32 located at an apparent position beyond the toric mirror, the apparent viewing distance being much greater than the actual optical distance to the rear projection screen 16. Optionally, viewer 10 may view the virtual image through a vision block or unity periscopes 13 (FIG. 1A) at center viewing station 12. Vision block or unity periscopes 13 provide a limited viewing window at viewing station 12 through which an operator sees the virtual image. Vision block or unity periscopes 13 thus emulate a small field of view or small window available to the operator.

The viewer's vertical field of view, absent vision block or unity periscopes 13, is limited only by the bottom of toric mirror 14 and the placement of the spherical rear projection screen 16 which the viewer must look beneath in order to see the toric mirror. The viewer's horizontal field of view is limited essentially only by the viewer's own field of view.

Figure 4A:
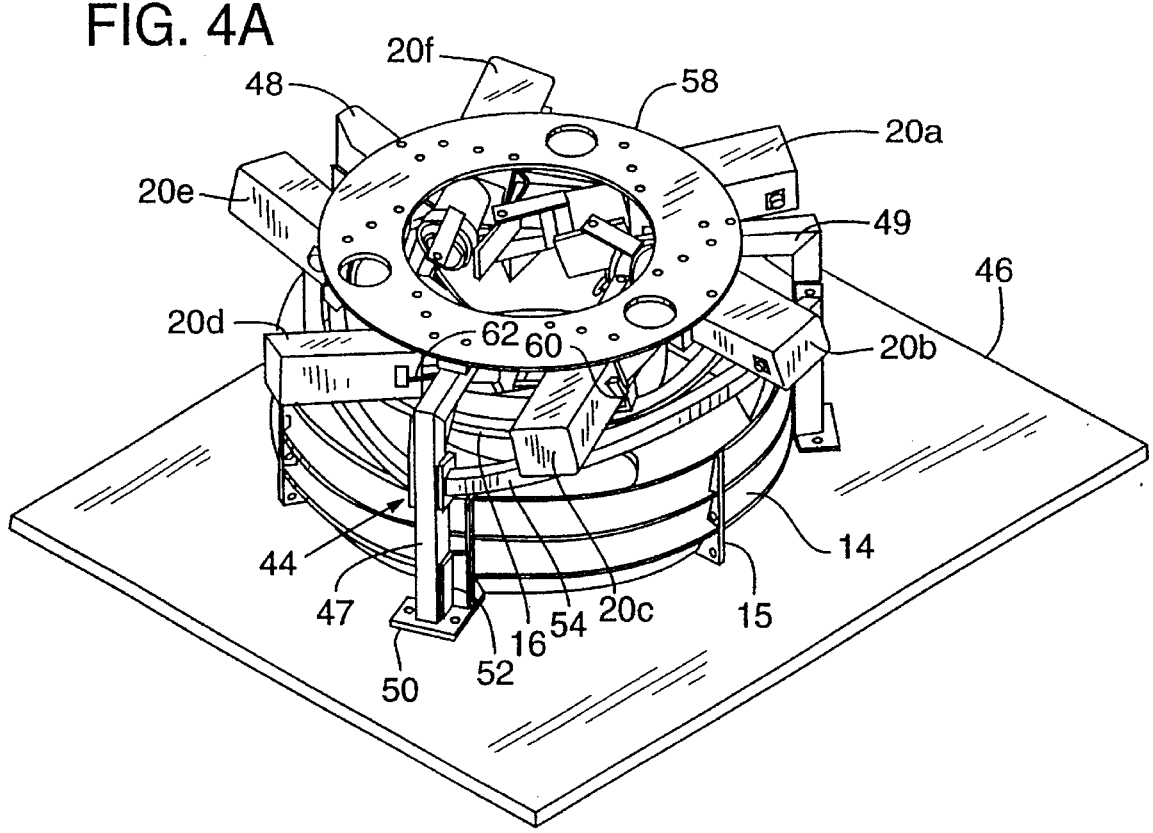
FIG. 4A is a perspective view illustrating the present invention as a compact panoramic projection system.
Figure 4B:
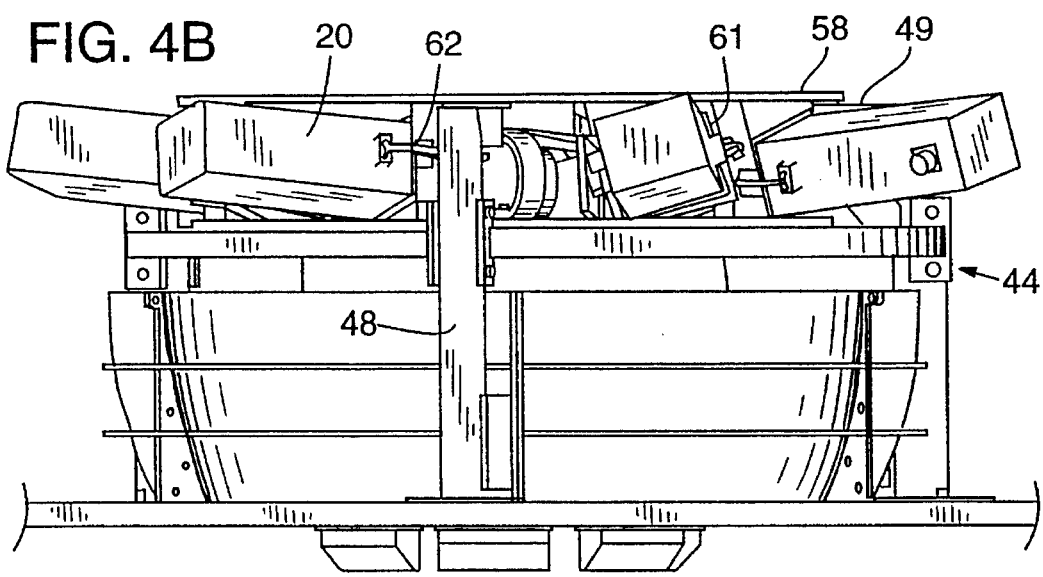
FIG. 4B is a side view of the FIG. 4A projection system.

Each projector of a plurality of projectors, shown in FIGS. 4A and 4B, supplies a portion of the panoramic image 30 on the spherical rear projection screen. FIG. 5 illustrates each projector 20a, 20b, . . . as casting its particular image light 66a, 66b, . . . of the object scene onto the projection screen 16 for producing the corresponding image sections 30a, 30b, . . . disposed in side-by-side abutting relationship with respect to neighboring sections. The particular portion 30a of the image corresponds to the image light 66a received indirectly from projector 20a via folding mirror 28a.

Projector 20a in FIG. 1B, comprising a high intensity CRT, provides an image which is optically projected by optics 24a on an initial optical path along an azimuth axis (pitch axis) 88 through color shutter 26a and toward folding mirror 28a. Folding mirror 28a redirects the light toward the spherical rear projection screen 16. To enable compact assembly, each projector, such as projector 20a, is angularly disposed just above an upper peripheral edge of the spherical rear projection screen 16 in a region opposite the allocated area for receiving image light 66a. In accordance with the present invention, folding mirrors 28a, 28b, . . . each provide an indirect optical path such that each projector may be oriented with its longitudinal axis disposed in tangential relationship to the periphery of the rear projection screen 16. The folding mirrors 28a, 28b . . . each define an angle of reflection of between 70° and 110° and preferably, an angle of about 90°. Each folding mirror 28 has two degrees of freedom for adjustment, i.e., yaw and pitch, to assure the projected image from an associated CRT is appropriately directed onto an allocated area of the screen 16. A mirror 28 rotates about pitch axis 88 for pitch adjustment, and about yaw pivot axis 96 for yaw adjustment.

Figure 2:
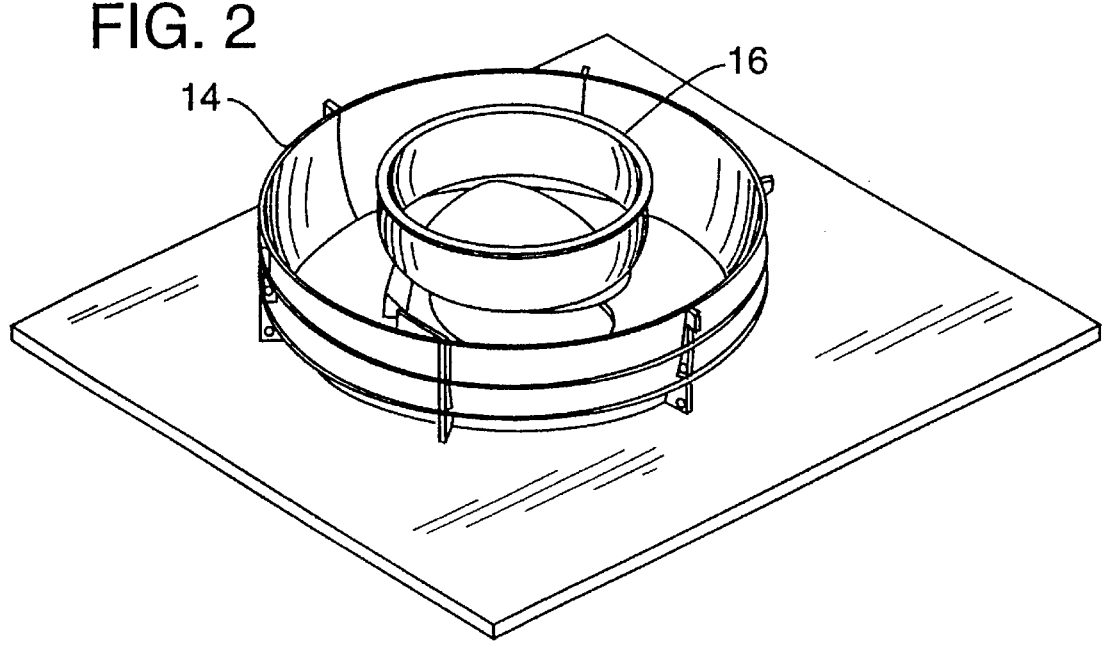
FIG. 2 is perspective view of a spherical rear projection screen and a toric mirror.
Figure 3:
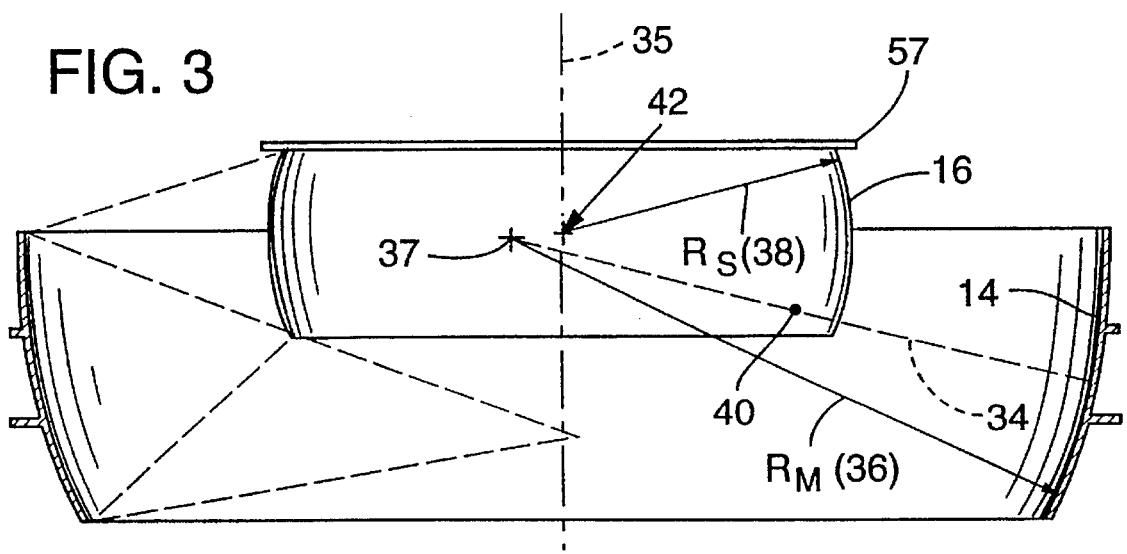
FIG. 3 is a cross-sectional view showing the spatial relationship between the spherical rear projection screen and the toric mirror.

FIGS. 2 and 3 illustrate in greater detail the relationship between the spherical rear projection screen 16 and toric mirror 14. Spherical rear projection screen 16 is a monolithic body of translucent plastic shaped as a section of a sphere having a radius $R_s$ centered on apparatus central axis 35. The spherical section corresponds to a horizontal slice centered about a horizontal plane passing through the center of the sphere. The rear projection screen is offset horizontally upwardly with respect to toric mirror 14 so that a viewer is able to observe the panoramic image beneath the lower lip of the rear projection screen. In a preferred embodiment, the spherical rear projection screen is disposed with its center plane substantially aligned with the horizontal plane defined by the upper peripheral edge of toric mirror 14.

Referring to FIG. 3, line 34 is a centerline of the illustrated cross section of mirror 14 (e.g. on the right hand side of the drawing), such mirror cross section comprising the arc of a circle. The length of line 34 is equal to the radius $R_m$ of the circle having its center of curvature at 37. If centerline 34 of the toric mirror 14 were rotated about central axis 35 of the apparatus, a figure of revolution comprising a conical shape could be visualized. If the toric mirror 14 were spherical, the distance from the mirror's surface to an apex on axis 35 of such conical shape would be equal to the radius of curvature of the mirror section. However, according to the present invention, the radius of curvature $R_m$ for the toric mirror section extends beyond axis 35. Thus, the toric mirror is not a spherical surface, but is instead representative of a compressed portion of a spherical surface, compressed inwardly such that a diameter extending from one side of the toric mirror to the other is less than twice the radius of curvature $R_m$ for the mirror section. It will be seen that toric mirror 14 has its largest diameter at its top edge, and curves inwardly proceeding downwardly, from such diameter. Since $R_m$ is the radius of curvature for the toric mirror section, then its focal point 40 along line 34, is at a distance equal to $R_m/2$ from the mirror section or one-half the radius of curvature of the mirror section. The actual surface of revolution which comprises toric mirror 14 has a radius less than radius of curvature $R_m$ in a vertical plane, that is, less than the radius of curvature of the arc comprising the mirror 14 cross section as depicted at the right hand side of FIG. 3. The described configuration contributes to reduction in size of the device, while producing accurate imaging.

$R_s$, the radius of curvature for rear projection screen 16, extends far enough such that the rear projection screen is disposed intermediate focal point 40 of the toric mirror and the concave surface of the toric mirror. By providing the spherical rear projection screen intermediate such focal point and the mirror's surface, the image reproduced by toric mirror 14 appears as an enlarged virtual image at a distance beyond the toric mirror. The apparent distance of the virtual image beyond concave toric mirror 14 is determined by the following equation:

$$\frac{1}{f} = \frac{1}{i} + \frac{1}{o} \qquad \text{Eq. 1}$$

wherein f is the mirror's focal distance from the concave surface thereof, i.e. $R_m/2$, i is the distance of the apparent image beyond the toric mirror, and o is the optical distance from the spherical rear projection screen to the concave surface of the toric mirror. Rearranging terms of Eq. 1 yields:

$$\frac{1}{i} = \frac{1}{f} - \frac{1}{o} \qquad \text{Eq. 2}$$

If the object image from which the apparent image is created were located at the focal point of the concave surface of the toric mirror, the object would appear to originate at an infinite distance beyond the toric mirror. However, with the spherical rear projection screen just inside the focal distance, the apparent image is viewable at an apparent distance short of infinity. Thus, the concave toric mirror supplies an enlarged image at a large apparent distance. The magnification achieved by the toric mirror is determined by:

$$m = \frac{i}{o} \qquad \text{Eq. 3}$$

In a specific embodiment of the present invention, i was 427 inches and o was 15.9 inches for a magnification, m, of 30.

FIGS. 4A–4B illustrate the overall organization of projection system 8. Support frame 44 mounted on platform 46 employs inverted L-brace structures 48. In accordance with one aspect of the present invention, platform 46 has a hole or aperture in its center so that a viewer may position himself as though looking from the hatch of a tank. In this form, the platform is mounted as to the top of a tank turret compartment, with the platform aperture located proximate the hatch position.

The inverted L-brace support structures 48 are mounted on the platform utilizing foot flanges 50, each proximate a lower end of a primary leg portion 47 of a support structure. Mirror mounting brackets 52 at the lower ends of the primary leg portions 47 of the structures secure toric mirror 14 to frame 44.

Beams 54 are interposed between the inverted L-brace supports, each beam including flanges at opposite ends thereof for coupling to the respective L-brace support structures proximate the upper ends of primary leg portions 47 near elbow junctions of respective L joints. In the preferred embodiment, three of the support structures 48 and three intermediate beams 54 are employed for frame 44.

With reference again to FIG. 1A, a screen mounting bracket 56 disposed on the distal end of horizontal arm 49 of each inverted L-brace support structure mounts and secures spherical rear projection screen 16. The screen mounting brackets 56 depend from the distal ends of respective upper horizontal arms 49 and fasten to lip 57 extending radially outwardly from the upper peripheral edge of screen 16. The screen mounting brackets offset the spherical rear projection screen upwardly relative to toric mirror 14 in the manner described hereinabove.

As shown in FIGS. 4A–4B, upper support ring 58 is disposed over the distal ends of the upper horizontal arms 49. The support ring 58 provides a "roof" from which to suspend and secure projectors relative to screen 16 and toric mirror 14. Each projector of projectors 20a, 20b, . . . depends from the aforementioned roof via a mounting bracket 60 as shown in FIG. 4A. The brackets 60 are spaced equally about the circumference of upper support ring 58 whereby the projectors are likewise spaced equally about the circumference of ring 58 for projecting allocated image light onto respective sections of the rear projection screen 16.

Each projector mounting bracket 60 comprises a rectangular frame 61 provided with hook latches 62. Latches 62 secure the rectangular exterior of a projector body within a surrounding rectangular frame 61 of mounting bracket 60 for seating the projector module appropriately with respect to the support frame. The projector mounting brackets 60 are appropriately oriented so that the axis of each one of the projectors extends substantially in tangential relationship with the peripheral circumference of rear projection screen 16. In addition, brackets 60 are each tilted slightly with respect to the horizontal, and are rotated slightly about the associated azimuth axis. The tilting and slight rotation preserve rectangularity of the projector image portions as cast upon the designated areas 30 of spherical rear projection screen from the CRT face plates via fold mirrors 84. The latches also enable a projector to be readily attached and removed from the overall assembly. With reference to FIG. 6A, latch receptacles 64 on each side of a projector protrude as U members from sides of the projector housing to receive hook latches 62. In the illustrated embodiment, six projectors are disposed about the circumference of the upper support ring 58 of the projection system, although a different number of projectors could be utilized if desired.

Figure 11A:
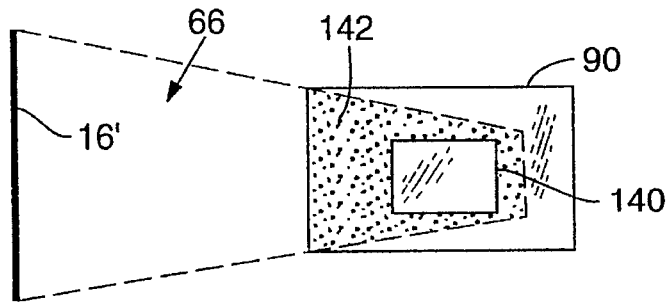
FIG. 11A is a side view of representative optical elements showing a linear relationship between a projector and a screen, looking along the projector's longitudinal axis.
Figure 11B:
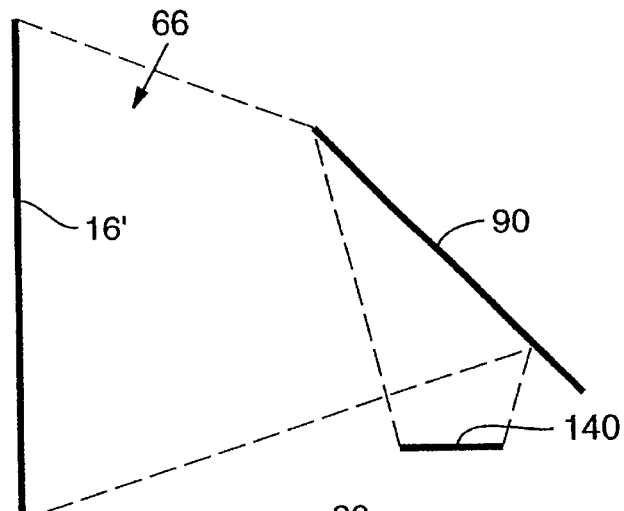
FIG. 11B is a top view of representative elements of FIG. 11A.
Figure 11C:
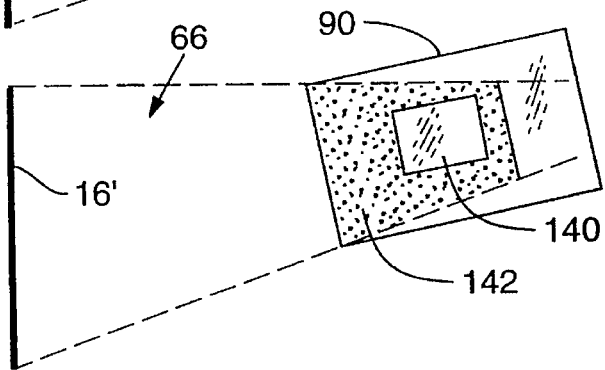
FIG. 11C is a side view illustrating image light as projected onto a screen from a projector wherein the projector is tilted and rotated for casting the image light downwardly onto the screen.
Figure 11D:
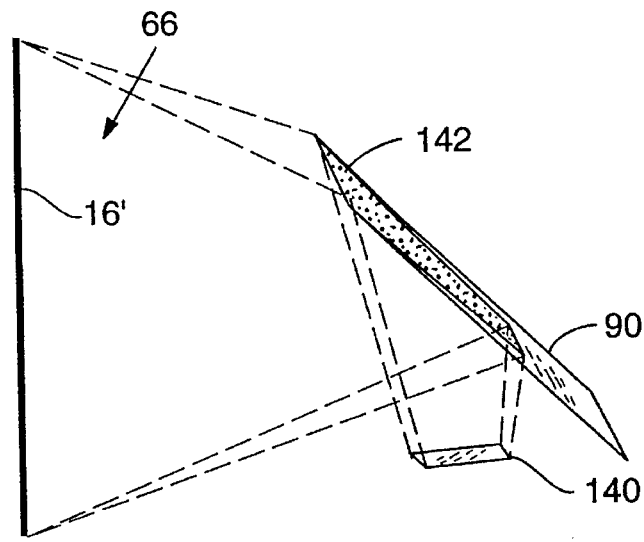
FIG. 11D is a top view showing elements of FIG. 11C.

FIGS. 11A and 11B illustrate the projection of a CRT image in linear relationship with respect to a representative translucent projection screen 16'. FIGS. 11C and 11D depict similar projection, but in accordance with the present invention, wherein the CRT is disposed above the spherical rear projection screen as well as being tilted and rotated slightly for projecting image light downwardly onto the inner surface of the spherical rear projection screen, while preserving image rectangularity. Note that because the CRT is angled downwardly and rotated slightly, a reflection mirror 90 of fold mirror assembly 84 is appropriately tilted and rotated so that the projected image light appropriately fills the allocated area of the rear projection screen.

With reference to FIG. 11A, a CRT provides an image having a rectangular outer contour as diagramed at 140, the CRT projecting image light toward mirror 90 which image light, as reflected, occupies an approximate area indicated by trapezoid 142. After being reflected by mirror 90, the image light 66 is directed onto screen 16', representative of the spherical rear projection screen 16. FIG. 11B is a top view illustrating the same elements.

With reference to FIG. 11C, the projector of the present invention is located above the screen 16 and is tilted downwardly while being rotated slightly for projecting its image light down and onto the spherical rear projection screen 16. Therefore, the rectangle 140, representative of the CRT image, is shown rotated with respect to the horizontal. In addition, the trapezoid area 142 of the mirror receiving the image light from the projector is no longer symmetrical with respect to a horizontal center line. However, by tilting and rotating the CRT and associated mirror, the rectangularity of the projected image light, as received at screen 16', is preserved for occupying the full vertical height and allocated width on the screen. FIG. 11D is a top view representative of the optical elements of FIG. 11C and illustrates that the CRT face plate angles away from the vertical in accordance with the projector's tilt, and is adjusted for a given "pitch" and "yaw" for directing the rectangular image of the CRT onto the desired rectangular area of screen 16' with minimal distortion.

With further reference to FIGS. 6A and 6B, CRT assembly 68 of projector 20 comprises a shell 69 forming the CRT housing that encases and mounts high intensity monochrome CRT 22. The CRT assembly 68 further includes deflection and focus coils 72 along with appropriate drive electronics 74. The rectangular face plate 78 of the CRT is coupled via a liquid coupling 82 to lens assembly 76.

Lens assembly 76 includes a tubular lens and barrel shell 77 seating lenses 80 for optically projecting the image from the CRT's face plate along a path toward fold mirror 84. The lens assembly projects the image from the substantially flat rectangular screen of a CRT onto the spherical image surface of a section of the rear projection screen in a manner for preserving image rectangularity. In one embodiment of the present invention, the lens system, provided by Norita Precision Inc., Kawgoe, Japan, had a CRT active coupling area of 7.5 inches, an f number of 1.1, a magnification of 2.8, a throw distance of 30 inches for projecting an image upon a screen of a 16-inch radius of curvature, a center transmission efficiency of greater than 85% with an edge loss of less than 45%, and a resolution of 60% or better at 4.5 LPs per millimeter with respect to a 1280×1024 pixel screen with color correction, and further including liquid coupling between the CRT and lens. Although these parameters for the lens assembly have been defined for a particular embodiment of the present invention, it is apparent parameters can change in accordance with desired dimensions for the system.

Further included in lens assembly 76 is a color shutter 81 for optically switching between color states and thereby imparting color to monochromatic image light as sourced by the high intensity CRT. In a preferred embodiments, the shutter was a NuCOLOR™ color shutter manufactured by Tektronix, Inc., Beaverton, Oreg. Its general operation will be described hereinbelow.

Still referring to FIGS. 6A and 6B, fold mirror assembly 84 receives projected light from lens assembly 76 and reflects the same onto the spherical rear projection screen. Assembly 84 includes barrel mount 86 that secures the fold mirror to the tubular lens barrel shell 77 of the lens assembly, the barrel mount 86 being provided with adjustments for rotating the mirror about a central pitch axis 88 of lens assembly 76. (See FIG. 7.) A mounting fork includes arms 91 and 92 extending longitudinally from the diameter of barrel mount 86 and these arms are supplied with apertures at their distal ends for pivotally mounting mirror 90 about yaw axis 96.

Figure 7:
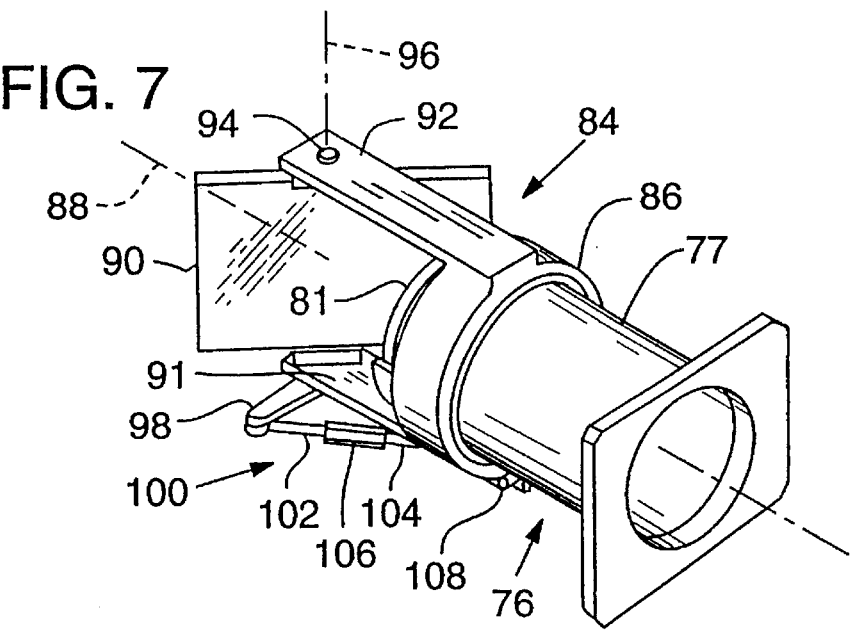
FIG. 7 is a perspective view of a fold mirror assembly.
Figure 8:
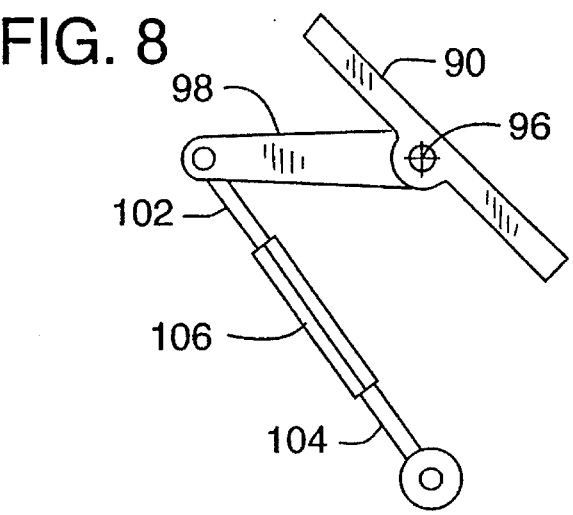
FIG. 8 is a partial top view of elements of the fold mirror assembly associated with the mirror's yaw adjustment.

With reference to FIGS. 7 and 8, yaw lever 98 attaches to mirror 90 proximate yaw axis 96 and has its distal end secured to adjustable length rod assembly 100. Rod assembly 100 is disposed between the distal end of yaw lever 98 and the proximal end of an arm 91 or 92 of the mounting fork near barrel mount 86. Rod assembly 100 comprises two separate rods 102 and 104 having first ends pivotally connected to yaw 98 lever and to the proximal end of the associated arm 91 or 92 while second threaded ends of rods 102 and 104 are intercoupled via adjustable sleeve 106. Adjustable sleeve 106 is threaded such that when sleeve 106 is rotated, the overall length of rod assembly 100 lengthens, or shortens, in accordance with the direction of rotation for selectively setting the pivot angle of mirror 90 about the yaw axis.

Figure 9:
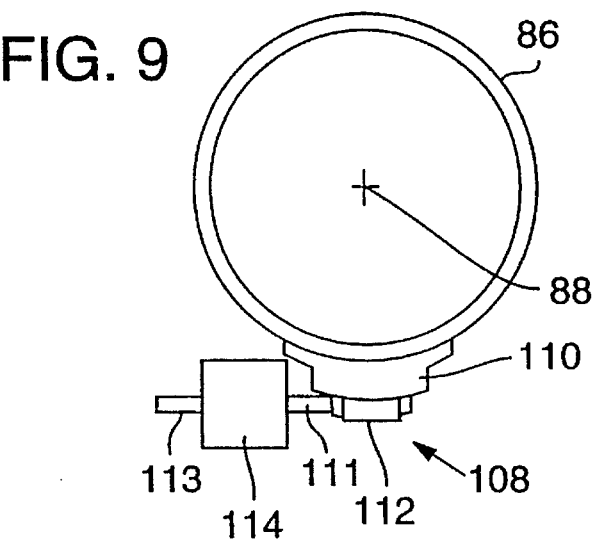
FIG. 9 is a view of the elements of the fold mirror assembly employed for pitch adjustment.

Barrel mount 86 is provided with a pitch-adjusting worm gear 108 for determining the pitch of the fold mirror relative to lens barrel 77. With reference to FIG. 9, the pitch adjusting worm gear 108 includes a toothed worm 112 which rotates in cooperation with toothed worm wheel 110 so that when shaft 111 rotates, barrel mount 86 turns around pitch axis 88 for altering the pitch of mirror 90. While not essential because worm 112 is capable of being finely adjusted, a gear reducer 114 may be included for enabling fine-tuning adjustment of the mirror's pitch. Shaft 111 of worm 112 is then suitably coupled to adjustment shaft 113 via a 5:1 gear reduction ratio whereby five turns of adjustment shaft 113 are required to provide one complete revolution of shaft 111.

In calibrating the yaw and pitch of the mirror, CRT screen 78 is supplied with an image which occupies its allocated rectangular area 140. This rectangular image is projected through lens assembly 76, reflected by fold mirror 84 and directed upon the inside surface of the spherical rear projection screen 16. The yaw adjustment in effect changes the horizontal placement of the projected image light 66a from projector 20a, so that the image is within the side boundaries of the particular portion 30a of the panoramic extension of the rear projection screen without overlapping neighboring portions 30b, 30c, . . . that receive image light 66b, 66c, . . . from respective neighboring projectors 20b, 20c, . . . . The pitch adjustment in effect changes the rotational and vertical placement of the projected image light 66a of projector 20a, so that its projected image light is located with proper orientation between the upper and lower area edges of the rear projection screen.

As mentioned, the projectors form images on respective portions of the spherical rear projection screen from associated positions vertically offset above the rear projection screen and opposite these portions of the screen. Each of the mirrors has a pitch for reflecting image light from the associated projectors downwardly as well as a yaw for locating an image properly along the length of the projection screen. In addition, it will be noted that each of the projectors is oriented with its longitudinal axis tilted slightly downwardly relative to the horizontal plane. Thus, the yaw pivot axis associated with each of the mirrors is rotated a slight amount in proportion to the projector's angle of inclination. Finally, in further reducing projection distortion, the rectangular screen of the CRT presenting the image is rotated (as depicted in FIG. 11C) about pitch axis 88 such that the rectangular outer perimeter 140 of the CRT image is rotated from the horizontal. By selecting the appropriate angle of inclination for the CRT from the horizontal plane and the rotational pitch of the image about the pitch axis, along with selecting the appropriate yaw and pitch for the fold mirror, it is possible to impart substantial rectangularity of the image as transferred to designated portions of the spherical rear projection screen.

Each fold mirror assembly provides a particular angle of reflection for light from its associated projector axis to the spherical rear projection screen. The angle of reflection corresponds primarily to the desired tangential relationship of the projector relative to the periphery of the spherical rear projection screen and is selected to be between 70° to 110°. Preferably, the angle of reflection provided by each fold mirror assembly is about 90°, enabling each associated projector's longitudinal axis to extend in substantially tangential relationship with respect to the periphery of the projection screen.

FIG. 10 is a block diagram of circuitry for drive electronics associated with producing images on a CRT within each of the projectors. A video signal demodulator and color separator 116 receives a video input signal and extracts red (R), green (G) and blue (B) color components of the video signal, providing output data representative of each of the respective R, G and B components on a pixel-by-pixel basis. The data includes luminance values as associated with the R, G and B colors of each pixel of each image field of the video signal.

A standard video signal includes two fields of interlacing lines for each frame of a video signal. For an NTSC video signal, frames arrive with a 30 Hz refresh rate, thus providing a field update rate of 60 Hz (two fields per frame). Each of the separate R, G and B color data is supplied sequentially to the CRT input synchronously with respective color shutter selections of color shutter 81 with three separate sequential color state selections being provided per each field update. Deflection circuitry 130 scans a write beam across the lines of the respective fields of the CRT while the write beam is modulated on a pixel-by-pixel basis in accordance with the luminance values associated with the R, G and B color values thereof. In scanning the lines for each of the three respective colors per each field update, the vertical deflection coils of the CRT are driven at an 180 Hz sweep rate for the three separate color states per field update, i.e. three times the normal vertical sweep rate. The CRT's write beam is modulated sequentially in accordance with the luminance values of each of the pixels of a given field associated with red, the luminance values of the same pixels associated with green, and finally the luminance values of the same pixels of the same field as associated with blue in synchronization with the associated R, G and B color state selections of color shutter 81. Timing module 126 receives a normal sync signal from demodulator 116 and provides 180 Hz output signals for driving switching control module 128 and providing the vertical sync signal driving the scanning and deflection circuitry 130. Timing module 126 supplies a third output signal of a frequency equal to the 180 Hz frequency times the number of lines per field. This third output signal drives the horizontal sync input of the scanning and deflection circuitry 130, thus providing the vertical sweep. For an NTSC video signal and a normal color CRT, the horizontal sweep rate is about;

$$60(\text{fields/second}) \times \frac{525}{2} \text{ (lines/field)} = 15.7 \text{ KHz} \qquad \text{Eq. 4}$$

For the present invention, employing a high intensity, high contrast monochrome CRT with three separate sequential color shutter color state selections, a horizontal sweep rate of three times 15.7 KHz (i.e., 47.1 KHz) is required in order to update each of the three separate color fields sequentially and separately per each video field update.

Switching control module 128 receives the 180 Hz clocking signal from timing module 126, this 180 Hz clocking signal being synchronously related to the vertical sync of the associated video signal. The switching control circuitry includes a state machine that supplies an output signal for driving multiplexer 124 and color shutter 81 in accordance with the desired sequential color state selections. As multiplexer 124 is driven sequentially per the three separate color state selections, it passes data from R, G and B frame buffers, 118, 120 and 122 respectively, in synchronization with the respective color state selections of color shutter 81.

Color shutter 81 as described hereinbefore was a NuCOLOR™ shutter manufactured by Tektronix, Inc. This color shutter employs known technology and comprises a plurality of series selective pi cells disposed in specific sequence with color selective reflector/polarizers. By selecting various operating states of the plurality of pi cells, the color shutter passes one of R, G or B light of given polarization upon receiving white light, in accordance the pi cell states selected. Color shutters other than the aforementioned specific shutter can be employed.

An advantage of the present invention is that wide field of view (FOV) collimated imagery can be presented in a very compact configuration. Previous systems using similar components have been five or more times larger in diameter in order to provide acceptable imagery in terms of convergence, dipvergence, divergence, resolution and distortion. The configuration according to the present invention makes collimation possible in simulators such as in single pilot aircraft, and in other applications where a single person views wide field imagery from a relatively fixed position.

While a preferred embodiment of the present invention has been shown and described, it will be apparent to those skilled in the art that many changes and modifications can be made without departing from the invention in its broader aspects. For example, a liquid crystal light valve (LCLV) or other type of projection system may suitably be employed in the projectors in place of the CRT. The appended claims are therefore intended to cover all such changes and modifications as fall within the true spirit and scope of the invention.

I claim:

1. An apparatus for presenting a panoramic scene about a viewing station comprising:

plural projectors, each projector providing light representative of a given portion of said panoramic scene;

a reflector for each projector that provides an indirect optical path for the propagation of projected light;

an intermediate rear-projection screen receiving the projected light from the plural projectors via the associated reflectors and providing a continuous panoramic object scene in accordance with the projected light received; and a reflector that forms an enlarged virtual image of said continuous panoramic object scene, said reflector directing the light rays of said continuous panoramic object scene such that said enlarged virtual image appears to be located at a distance from the viewing station substantially greater than that of the direct optical path.

2. An apparatus according to claim 1 wherein each projector of said plural projectors comprises:

a high intensity CRT forming an image on a screen thereof; and a lens assembly that optically projects the CRT image toward the projector's associated reflector;

each said projector having an initial propagation direction that is substantially parallel to the longitudinal axis of its associated CRT, wherein the reflector associated with each projector redirects the propagation direction by a reflection angle of between 70° to 110°.

3. An apparatus according to claim 2 wherein each projector of said plural projectors further comprises a color switch disposed in the optical path of the projected image.

4. An apparatus according to claim 3 wherein said color switch includes three selectable color states and passes light of a respective one of three colors in accordance with the color state selected, said apparatus further comprising:

drive circuitry for sequentially driving said CRT with separate luminance image information of said three colors so that said CRT screen is separately and sequentially illuminated with the separate luminance image information of said three colors; and a color switch controller for selecting color states of said color switch in accordance with the respective luminance image information of said three colors on the CRT screen.

5. An apparatus according to claim 4 wherein said drive circuitry includes:

R, G and B frame buffers for providing the respective luminance image information as associated with red, green and blue color components of an image frame; and multiplexing circuitry for sequentially coupling said CRT to the respective R, G and B frame buffers for receiving the respective luminance image information thereof, said R, G and B frame buffers being selected in synchronization with the selection of associated color states of said color switch.

6. An apparatus according to claim 1 wherein the intermediate imager comprises a rear projection screen that receives said projected light on one surface thereof and portrays the continuous panoramic object scene on the opposite surface.

7. An apparatus according to claim 6 wherein the rear projection screen has a spherical contour shape of a given circumference and is translucent, said projected light as redirected by said associated reflectors being received upon the rear projection screen's inner surface and portraying said continuous panoramic object scene from its outer surface, each reflector redirecting the projected light of the associated projector with the longitudinal length of each projector being oriented in substantially tangential relationship to the periphery of the rear projection screen.

8. An apparatus for presenting a panoramic view, said apparatus having a vertical central axis, said apparatus comprising:
 a toric mirror having a cross section of an arc of a circle in the vertical plane of said apparatus' central axis, the radius of said circle is greater than half the diameter of said toric mirror;
 a rear projection screen for receiving projected image light upon its inner surface and presenting a panoramic object image to the toric mirror from its outer surface, said rear projection screen comprising a segment of a sphere having a radius of curvature originating at said central axis; and
 a plurality of projectors that provide said projected image light, each projector providing image light for an associated portion of said panoramic object image.

9. An apparatus according to claim 8 wherein the rear projection screen presents the panoramic object image to the toric mirror at a proximity closer to the concave reflective surface of the toric mirror than the focal distance thereof so that a magnified virtual image of the object image optically appears at a substantial distance beyond the reflective surface of said toric mirror.

10. An apparatus according to claim 8 wherein the rear projection screen has a spherical, concave outer surface of a radius less than the larger of the two radii of curvature of the concave reflective surface of the toric mirror.

11. An apparatus according to claim 10 wherein the rear projection screen has a radius of curvature from said central axis which is disposed in vertically offset relation above the center of the toric mirror for providing a panoramic object scene for the toric mirror similarly above the toric mirror so that a virtual image is viewable along an optical path beneath and without interference from the rear projection screen.

12. An apparatus according to claim 10 wherein the plurality of projectors project image light of respective portions of said panoramic object image, with each associated portion matching contiguously with neighboring portions thereof such that said panoramic object image is substantially continuous.

13. An apparatus according to claim 10 wherein each projector includes:
 a high intensity CRT having a screen providing a CRT image corresponding to its associated portion of the panoramic object image; and
 projection optics for focusing rays of light of the CRT image and projecting image light thereof along an optical path toward an allocated area of the rear projection screen, said allocated area of the rear projection screen being contiguously related to neighboring allocated areas of the rear projection screen that are to receive projected image light from others of the plurality of projectors.

14. An apparatus according to claim 13 wherein each projector includes a color switch disposed in the optical path of projected image light, the color switch having selectable states for passing respective colors of light.

15. An apparatus according to claim 13 wherein each projector is proximate a position disposed above the rear projection screen and opposite, across a diameter of, the rear projection screen.

16. An apparatus according to claim 15 wherein each projector includes a reflector for directing the projector's associate image light down and across the diameter of the rear projector screen onto the allocated area of the rear projection screen.

17. An apparatus according to claim 16 wherein each said reflector provides a folded optical path for propagating said image light from the respective CRT, the CRT and projection optics having an optical projection axis oriented above and in primarily tangential relationship to an upper periphery of the rear projection screen.

\* \* \* \* \*